(12) United States Patent
Forlines

(10) Patent No.: US 7,526,725 B2
(45) Date of Patent: Apr. 28, 2009

(54) CONTEXT AWARE VIDEO CONVERSION METHOD AND PLAYBACK SYSTEM

(75) Inventor: Clifton L. Forlines, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 307 days.

(21) Appl. No.: 11/102,116

(22) Filed: Apr. 8, 2005

(65) Prior Publication Data

US 2006/0228048 A1 Oct. 12, 2006

(51) Int. Cl.
G06F 3/00 (2006.01)
G09G 3/34 (2006.01)
(52) U.S. Cl. ............... 715/723; 715/719; 715/726; 382/173; 382/276; 382/284
(58) Field of Classification Search ......... 715/219–226; 382/162, 107, 168, 173, 284; 348/333.11, 348/333.12, 113
See application file for complete search history.

(56) References Cited

U.S. PATENT DOCUMENTS

| | | | | |
|---|---|---|---|---|
| 5,459,830 A * | 10/1995 | Ohba et al. | ............ | 345/473 |
| 5,751,377 A * | 5/1998 | Kadono et al. | ............ | 348/586 |
| 5,859,663 A * | 1/1999 | Simon | ............ | 348/14.07 |
| 5,920,657 A * | 7/1999 | Bender et al. | ............ | 382/284 |
| 5,995,095 A * | 11/1999 | Ratakonda | ............ | 715/500.1 |
| 6,154,771 A * | 11/2000 | Rangan et al. | ............ | 709/217 |
| 6,266,068 B1 * | 7/2001 | Kang et al. | ............ | 345/629 |
| 6,278,446 B1 * | 8/2001 | Liou et al. | ............ | 715/700 |
| 6,278,466 B1 * | 8/2001 | Chen | ............ | 345/473 |
| 6,549,245 B1 * | 4/2003 | Lee et al. | ............ | 348/700 |
| 6,567,536 B2 * | 5/2003 | McNitt et al. | ............ | 382/107 |
| 6,636,220 B1 * | 10/2003 | Szeliski et al. | ............ | 345/475 |
| 6,678,689 B2 * | 1/2004 | Yoon et al. | ............ | 707/101 |
| 6,744,922 B1 * | 6/2004 | Walker | ............ | 382/190 |
| 6,807,306 B1 * | 10/2004 | Girgensohn et al. | ............ | 382/225 |
| 6,870,573 B2 * | 3/2005 | Yeo et al. | ............ | 348/569 |
| 6,996,171 B1 * | 2/2006 | Walker et al. | ............ | 375/240.09 |
| 7,050,070 B2 * | 5/2006 | Ida et al. | ............ | 345/629 |
| 7,103,231 B2 * | 9/2006 | Cornog et al. | ............ | 382/276 |
| 7,177,470 B2 * | 2/2007 | Jasinschi et al. | ............ | 382/170 |
| 7,469,074 B2 * | 12/2008 | Adams et al. | ............ | 382/284 |
| 2002/0051010 A1 * | 5/2002 | Jun et al. | ............ | 345/723 |
| 2002/0051077 A1 * | 5/2002 | Liou et al. | ............ | 348/465 |
| 2003/0118214 A1 * | 6/2003 | Porikli | ............ | 382/107 |
| 2004/0027369 A1 * | 2/2004 | Kellock et al. | ............ | 345/716 |
| 2004/0125124 A1 * | 7/2004 | Kim et al. | ............ | 345/716 |
| 2004/0267521 A1 * | 12/2004 | Cutler et al. | ............ | 704/202 |
| 2005/0058431 A1 * | 3/2005 | Jia et al. | ............ | 386/69 |
| 2005/0183016 A1 * | 8/2005 | Horiuchi et al. | ............ | 715/719 |

OTHER PUBLICATIONS

Chua, et al., "A video retrieval and sequencing system," vol. 13, Issue 4 (Oct. 1995).*

(Continued)

*Primary Examiner*—Tadeese Hailu
(74) *Attorney, Agent, or Firm*—Dirk Brinkman; Gene Vinokur

(57) ABSTRACT

A computer implemented method converts and displays a video. An input video acquired of a scene is segmented into shots. Similar shots are combined sequentially into corresponding chains. Each frame of the input video is then rendered into a composite image according to the chains and templates.

21 Claims, 7 Drawing Sheets

OTHER PUBLICATIONS

Di Zhong, et al., "Clustering Methods for Video Browsing and Annotaion," (1997).*

Davenport, etal., "Cinematic Primitives for Multimedia," MIT Media Laboratory, Jul. 1991.*

Sack, et al., "IDIC: Assembling Video Sequences from Story Plans and Content Annotations," MIT Media Lab., 1994.*

X. U. Cabedo and S. K. Bhattacharjee, "Shot Detection Tools in Digital Video," Proc. of Non-linear Nodel Based Image Analysis 1998, Springer Verlag, pp. 121-126, Jul. 1998.

R. Lienhart, "Comparison of Automatic Shot Boundary Detection Algorithms," Image and Video Processing VII 1999, Proc. SPIE 3656-29, Jan. 1999.

T. Lin, H.J. Zhang, "Video Scene Extraction by Force Competition," 2001 IEEE Intl Conf on Multimedia and Expo, Aug. 22-25, 2001.

L. Zhao, et al, "Video Shot Grouping Using Best-First Model Merging," Proc. 13th SPIE symposium on Electronic Imaging—Storage and Retrieval for Image and Video Databases, Jan. 2001.

Maurizio Pilu, "On Using Raw MPEG Motion Vectors To Determine Global Camera Motion," Digital Media Department, HP Laboratories, HPL-97-102, Aug. 1997.

Ryan C. Jones, Daniel DeMenthon, David S. Doermann, "Building mosaics from video using MPEG motion vectors," Language and Media Processing Laboratory, Institute for Advanced Computer Studies, University of Maryland, Technical Report: LAMP-TR-035/ CAR-TR-918/CS-TR-4034, University of Maryland, College Park, Jul. 1999.

* cited by examiner

| | |
|---|---|
| A1-B1-A2-B2-A3 | 2 Chains back and forth – template renders frames from chain A into one region of the screen and renders frames from chain B into another region of the screen |
| A1-B1-A2-C1-B2-A3-C2 | 3 chains overlapping – template renders frames from chain A into one region of the screen and renders frames from chain B into another region of the screen. Frames from chain C are rendered into the entire screen behind the regions for chains A and B. |
| D1-A1-B1-A2-B2-A3 | 3 chains "foundation shot" – template renders frames from chain D into the entire screen, and frames from chains A and B into regions of the screen. The last frame from shot D1 remains in the background of the screen through shot A3 |
| A1(long) B1(short) A2(long) | 2 Chains – template renders frames from chain A into the entire screen, and animates the region for chain B that the shot B1 begins small, increases in size to fill about ¼ of the screen, and then decreases in size until it is no longer visible. |
| A1-B1-A2-B2-A3-C1-A4-C2 | 3 Chains non overlapping – chains B and C do not overlap. Frames from Chain A are rendered into a centered region of the screen. Frames from chain B are rendered into a region on the left, and frames from chain C are rendered into a region on the right. |

*FIG. 7*

CONTEXT AWARE VIDEO CONVERSION METHOD AND PLAYBACK SYSTEM

FIELD OF THE INVENTION

The invention relates generally to processing videos, and more particularly to processing videos for later playback according to a context of the videos.

BACKGROUND OF THE INVENTION

While display surfaces, e.g., television, projector and terminal screens, are becoming physically larger and with increased resolution, the manner in which videos are displayed has remained much the same. In general, videos produced for smaller display surfaces are simply scaled up to fill the entire display surface. Little is done to take full advantage of what a large display surface has to offer.

For example, a high-definition television (HDTV), capable of displaying 1920×1080 pixels, takes a standard definition television signal with a resolution of 640×480 pixels, and simply scales the low-resolution video to fill the high-resolution display surface.

A video is composed of a sequence of frames, which are often encoded and compressed to decrease bandwidth and memory requirements. Each frame is displayed independently of a previous or next frame. At no time do conventional devices display concurrently more than one frame from the same video.

SUMMARY OF THE INVENTION

The invention converts an input video to an output video. The input video includes shots that are normally displayed sequentially on a display surface. The output video includes shots that are displayed concurrently and in parallel on different regions of the display surface.

The manner in which the shots are selected, the length of the shots, and the treatment of previously displayed shots are based on a context of the input video. The context can include the content of the input video and camera motion, e.g., panning, or zooming. By displaying the shots in this manner, the context of the video is reflected in its presentation, and the viewing experience is enhanced.

BRIEF DESCRIPTION OF THE DRAWINGS

FIG. 7 is a table of example templates.

DETAILED DESCRIPTION OF THE PREFERRED EMBODIMENT

Figure 1:
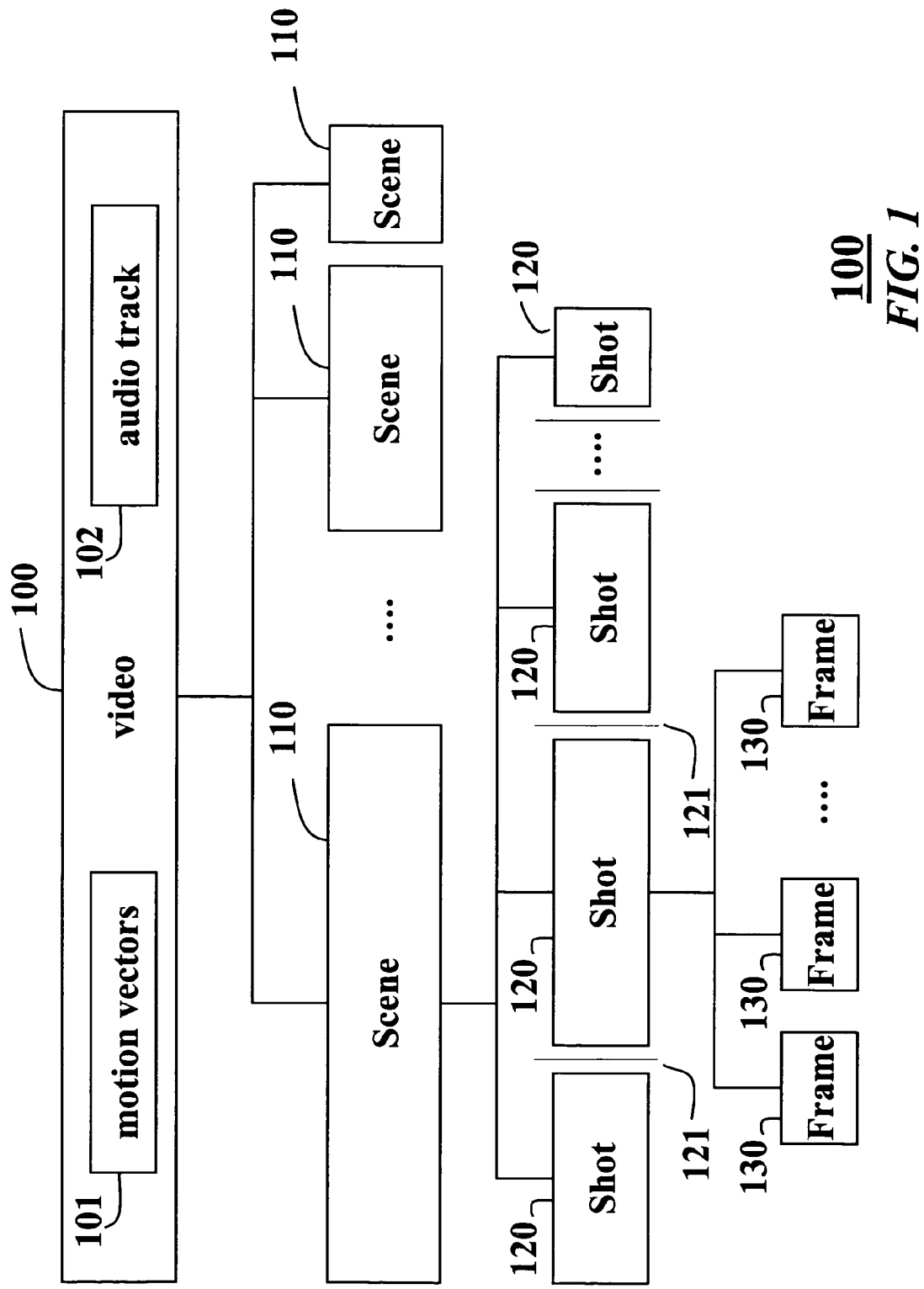
FIG. 1 is a block diagram of an input video to be processed according to the invention.
Figure 2:
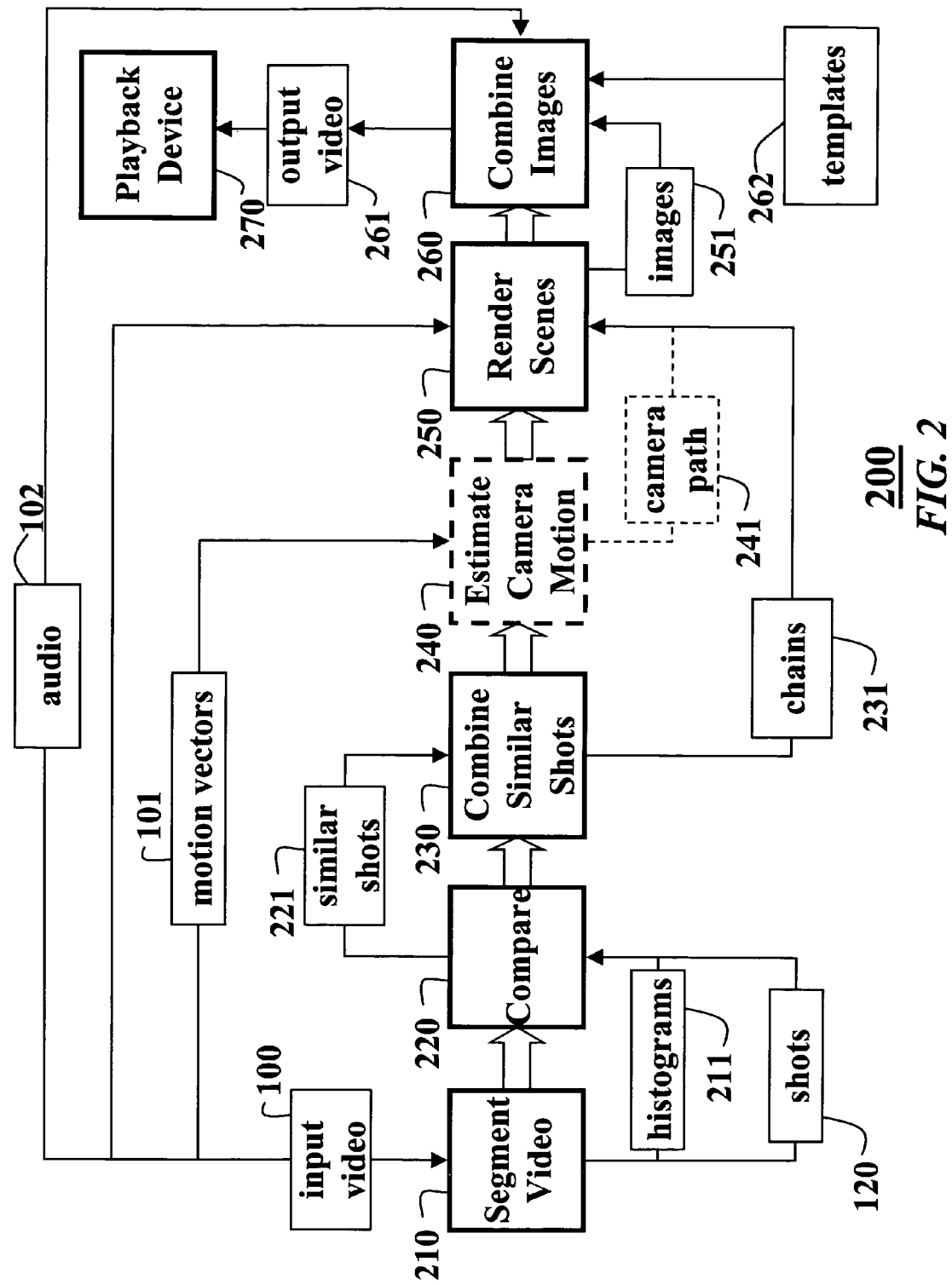
FIG. 2 is a flow diagram of a method for processing the input video to produce an output video.
Figure 3:
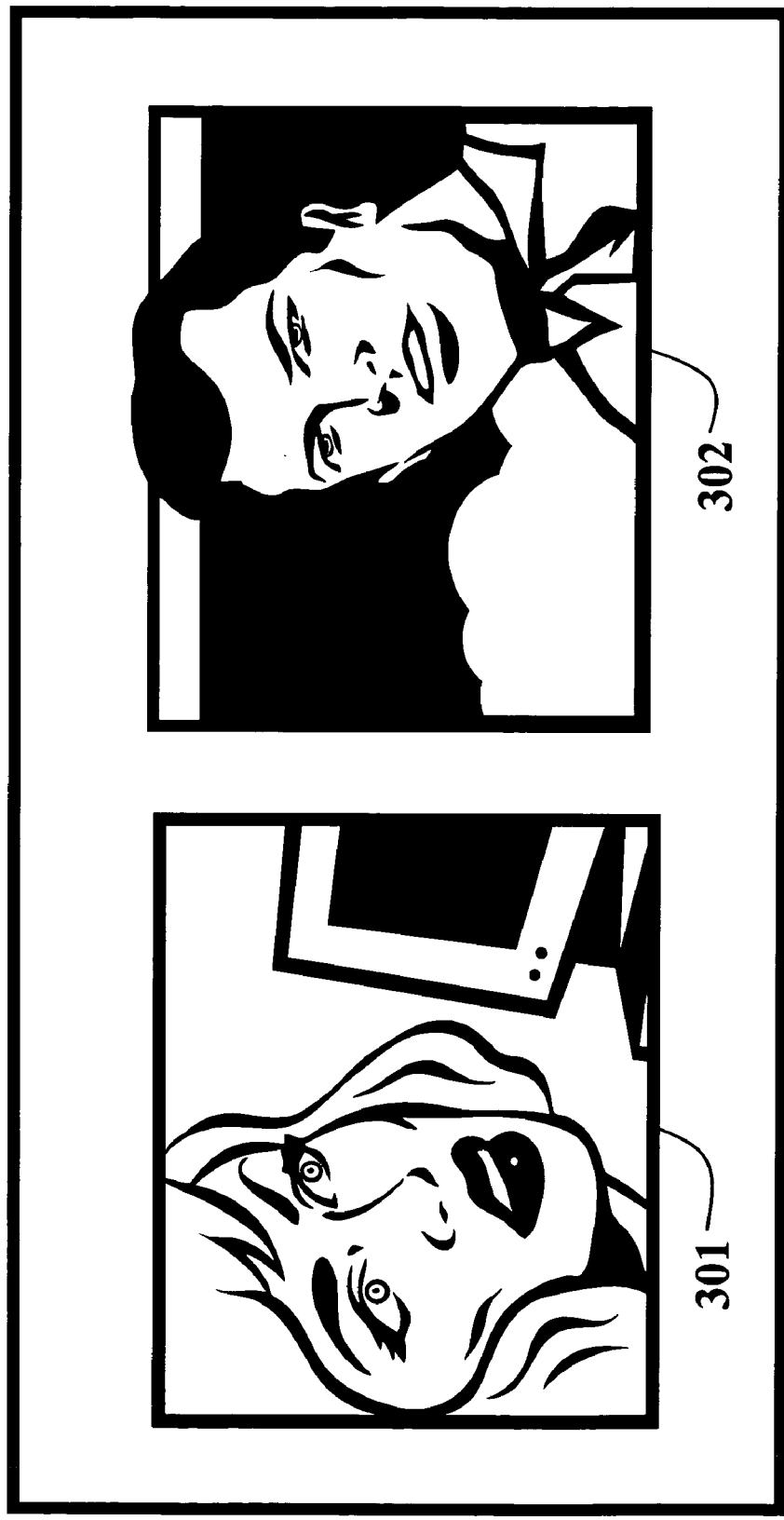
FIG. 3 is a block diagram of a frame of the output video including two frames of the input video converted according to the invention.

FIG. 1 shows an input video 100 to be processed according to our invention. FIG. 2 shows a method 200 for processing the input video 100 according to the invention to produce an output video 261. FIG. 3 shows one frame 300 of the output video.

Typically, the output video has a resolution that is substantially higher than the input video. That is, the output video is formatted for display on a large display surface, e.g., a HDTV. However, it should be understood, the input and output videos can have any reasonable resolutions, including the same resolutions.

As shown in FIG. 1, the input video 100 has a hierarchical structure including one or more scenes 110, each scene includes one or more 'shots' 120, and each shot includes one or more frames 130. The shots are separated by shot boundaries 121. Although the invention is described for a single scene, it should be understood that the invention can be applied to any video including any number of scenes and any number of shots in any of the scenes.

For the purpose of describing the invention, in an example application, the video is of a scene where two characters are talking to each other. This is a very common scene in videos. Typically, the shots alternate sequentially between the two characters as they speak, and the shots are recorded and displayed on a display surface sequentially. It is desired to produce and display an output video on the display surface so that both characters appear concurrently.

FIG. 2 shows a method 200 for converting and displaying the video 100 according to our invention. The video 100 is first segmented 210 into shots 120 by detecting shot boundaries 121. The shots are compared 220 to detect sets of similar shots 221. Similar shots 221 are combined 230 to form corresponding 'chains' 231.

In an optional step, camera motion 241 is estimated 240 from the motion vectors of the video 101. Using the input video 100, the chains 231, and the camera motion 241, the scene is rendered 250 to produce images 251. The images are arranged sequentially 260 to produce the output video 261, which can be displayed using a playback device 270, e.g., a television or personal computer.

Figure 6:
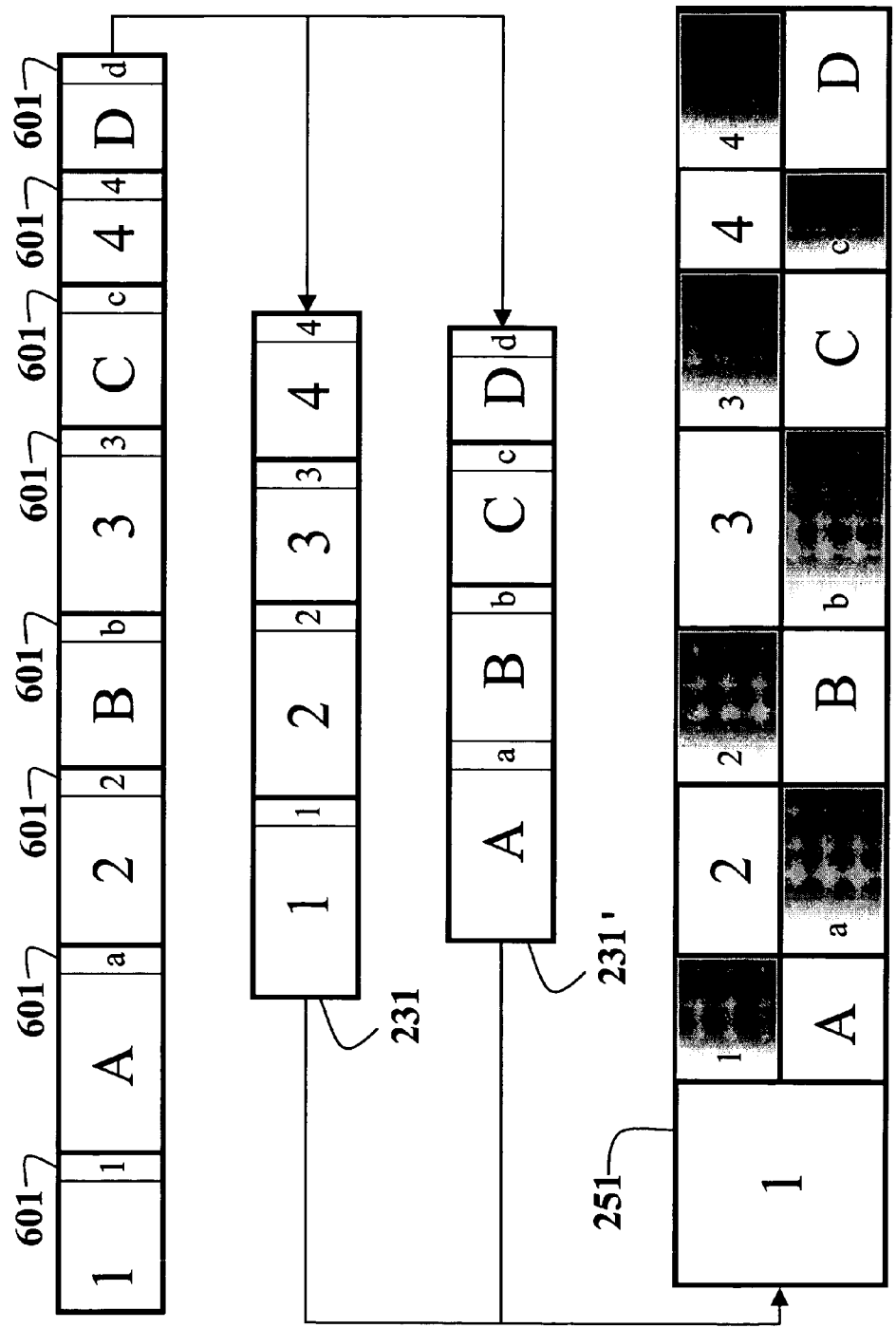
FIG. 6 is a block diagram of the input video, chains, and composite images according to the invention.

FIG. 6 summarizes this process. The input video 100 includes alternating shots (1, 2, 3, 4), and (A, B, C, D). The last frame 601 of each shot is indicated in lower case. The input video is parsed into two chains 231 and 231'. The frames of the chains are then combined into composite images 251. Note that the composite images for the first shot of the first chain do not include any frames of the second chain. Also note, that the composite images of following shots include the last frame of the previous shots as a still frames fading to black.

Video Segmentation

A number of processes are known for segmenting videos into shots 120 by detecting shot boundaries 121. The methods can be based on pixel differences, encoded macroblocks, and edges, X. U. Cabedo and S. K. Bhattachaijee, "Shot Detection Tools in Digital Video," Proc. of Non-linear Model Based Image Analysis 1998, Springer Verlag, pp 121-126, July 1998; H. J. Zhang, et al, "Automatic Partitioning of Full-Motion Video," ACM Multimedia Systems, Vol 1, pp 10-28, 1993; and R. Lienhart, "Comparison of Automatic Shot Boundary Detection Algorithms," Image and Video Processing VII 1999, Proc. SPIE 3656-29, January 1999.

All of those processes are similar in that they compare adjacent frames to detect when there is a significant difference between the frames that is indicative of a shot boundary.

We prefer to use color histograms 211. We construct a color histogram for each frame 130 of the input video 100. Each histogram has 256 bins for each RGB color component. We compare the histograms of adjacent frames as follows.

For each of the three color components, we sum an absolute difference between the values for each corresponding pair of bins giving us a total difference for red, green, and blue between two frames. Each of the three total differences is compared with the average difference for the respective color for the previous N pairs of frames. If the difference for any of the three colors is greater than a predetermined threshold value times the average difference for that color, then a shot boundary 121 is detected. To handle errors in an encoded video, shots that include fewer than M frames, e.g., five, are combined with an immediately following shot.

Comparing Shots for Similarity

A scene, as in our example scene of characters talking, is typically a contiguous sequence of shots that are logically related according to their content, T. Lin, H. J. Zhang, "Video Scene Extraction by Force Competition," 2001 IEEE Intl Conf on Multimedia and Expo, Aug. 22-25, 2001; L. Zhao, et al, "Video Shot Grouping Using Best-First Model Merging," Proc. 13th SPIE symposium on Electronic Imaging—Storage and Retrieval for Image and Video Databases, January 2001; and X. Lu, Y. F. Ma, H. J. Zhang and L. Wu, "An Integrated Correlation Measure for Semantic Video Segmentation," 2002 IEEE Intl Conf on Multimedia and Expo, Aug. 26-29, 2002.

For comparing the similarity of shots, we prefer to use the color histograms 211, as described above. We compare the first frame in a current shot with the last N frames of previous S, e.g. five, shots, as described above. If a shot begins with a frame that is similar to the last frames of a previous shot, then the shots are likely to be related to the same scene. A chain 231 is created whenever two or more shots are found to be similar, i.e., the shots have the same people, objects, or backgrounds. Chains can include several shots, and the similar shots in a chain do not need to be contiguous in time.

Any technique, or combination of techniques, that produce a chain of visually similar shots that are located relatively close together in time is compatible with our invention.

Combining Similar Shots

We produce the corresponding chains 231 by combining similar shots. For our example, there are two chains. One chain is all the similar shots of one character talking, and the other chain is of all of the similar shots of the other character talking. It should be understood, that there could be three characters, in which case there would be three chains. Because these chains overlap in time, we group them together into a scene for the output video 261.

There could also be more than one scene. For example, one scene has two characters and another scene has three characters, and the scenes alternate, and the shots in each scene alternate. In this case, there would be five chains.

It should be noted that not every shot needs to be part of chain. We also compare the start and end shot of each chain to determine overlapping chains, which we call scenes. Shots that lie between the first and last shot of a scene and are not included in a chain are added to that scene as a chain containing a single shot.

Shots that are not included in any chain, and do not lie between the start and end of a scene are labeled as orphans. Orphans that are contiguous are combined into orphan chains. Orphans that are surrounded on either side with a scene are added to a trailing chain.

Estimating Camera Motion

Videos encoded according the MPEG standard include motion vectors 101 in P-frames. A number of techniques are known for estimating camera motion from the motion vectors, Maurizio Pilu, "On Using Raw MPEG Motion Vectors To Determine Global Camera Motion," Digital Media Department, HP Laboratories, HPL-97-102, August, 1997; Ryan C. Jones, Daniel DeMenthon, David S. Doermann, "Building mosaics from video using MPEG motion vectors," Language and Media Processing Laboratory, Institute for Advanced Computer Studies, University of Maryland, Technical Report: LAMP-TR-035/CAR-TR-918/CS-TR-4034, University of Maryland, College Park, July 1999. All those techniques estimate camera motion in an image plane from the motion vectors in MPEG encoded videos.

Other techniques for estimating camera movement include feature based tracking, C. Morimoto and R. Chellappa, "Fast 3D stabilization and mosaic construction," Proceedings of the IEEE Conference on Computer Vision and Pattern Recognition, pages 660-665, 1997; or hierarchical direct registration, Irani, P. Anandan, and S. Hsu, "Mosaic based representations of video sequences and their applications," Proceedings of the International Conference on Computer Vision, pages 22-30, 1995, or optical flow, L. Teodoiso and W. Bender, "Salient video stills: Content and context preserved," Proceedings of the ACM Multimedia Conference, pages 39-46, 1993.

We prefer to parse motion vector data directly from the input video 100 encoded according to the MPEG-2 standard. For each frame in a shot, the variance for the motions in both the X and Y directions are determined for all of the vectors. If the variance is below a predetermined threshold, then the average motion for all motion vectors is recorded.

In other words, if the most of the motion vectors for a single frame are all more or less pointing in the same direction, then we assume that the camera is moving in that direction and we record the motion. If the variance is above the threshold, then we record a vector of length zero.

In this manner, we produce a list of average vectors for each shot that has a single vector that corresponds to each frame in the shot. These lists, one for each segment in the video, are the camera paths 241 for the corresponding shot. We can use the camera paths to render the input video on a display surface in a novel way, as described below.

Render Scene Images

To render the images 251, we have as input the input video 100, the chains 231, and the camera paths 241. The rendering 250 takes each frame from the input video and renders a new image using the original frame, the shot and scene that the frame is a part of, i.e., one of the chain 231, and optionally, the camera path 241 for the shot that the frame is a part of. The result of this step is a sequence of images with a length equal to the number of frames in the input video.

Templates

For each scene in the list of scenes, we compare the structure of that scene to predetermined templates 262 in order to select a most appropriate rendering for the frames of that scene. By structure, we mean the number and pattern of chains in the scene, the presence of shots in the scene not included in a shot chain, the length of the chains, and the amount of overlap of the chains of a scene.

For the example scene, there are two overlapping chains, one for each talking character. The templates are ranked based on how closely the characteristics of the scene match an ideal scene represented by the template. The method then uses the template that most closely matches the scene to render a new image for each frame in that scene of the input video.

Each template generates initially a blank image. Then, the frame from the input video is rendered into a region of the blank image, perhaps filling the entire image. This image is then recorded, and a next frame from the input video is rendered into a region of the image. The region that this next frame is drawn into may or may not overlap the previous region, and the previous image may or may not be cleared of content.

As shown in FIG. 3, the example scene includes two characters talking to one another. Typically, the shots alternate sequentially between the two characters as they speak. The template for rendering this scene according to the invention renders each frame from a first chain into a region 301 of the left side of the image 300, and each frame from the second chain into a region 302 on the right side of the image 300.

The result is a sequence of images in which the talking characters appear on the left and right side of the images. During playback, a viewer of this sequence of images alternately sees the actively talking character in either the left or the right region, and the non-speaking character displayed as a still frame in the other region. The still frame corresponds to the last frame of the shot where that character is talking. Fading techniques can be used as the active shots alternate with the still frames. For example, the still frame on the right can slowly fade while the active shots on the left continues, until the still frame on the right becomes an active shots again, and the left region shows a slowly fading still frame.

In addition to fading techniques, any number of conventional image filtering techniques can be used. Still frames can reduce their color saturation over time, i.e., the still frames change into a black-and-white image. The still frames can also be blurred, pixilated, or converted to a sepia tone.

In a variation of the invention, the template can use a gaze direction detection process on the frames in each of the chains. A number of techniques are known for estimating gaze direction of faces in images, including Axel Christian Varchmin, Robert Rae, Helge Ritter, Image Based Recognition of Gaze Direction Using Adaptive Methods, Lecture Notes in Computer Science, Volume 1371, January 1998, Page 245. Such a process recognizes that the woman in FIG. 3 is facing to the right and that the man in FIG. 3 is facing to the left. The frames in the chains can then be combined so that the two characters appear to face one another.

Figure 4:
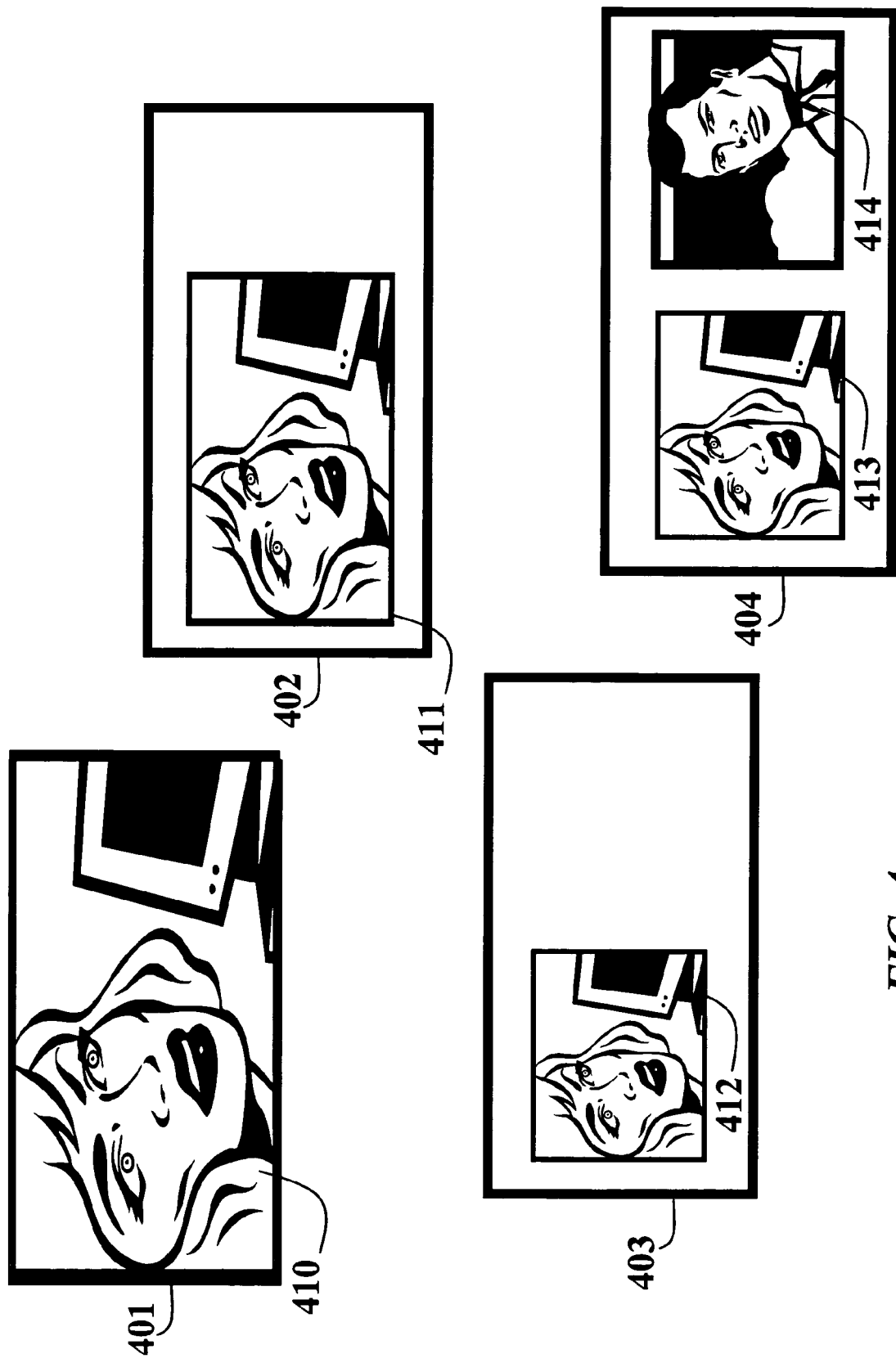
FIG. 4, is a block diagram of animated frames according to the invention.

As shown in FIG. 4, a template can be designed to animate regions of the output images into which frames of shots of the input video are rendered. The animation can consider time, or the length of the shot. FIG. 4 shows four consecutive output images 401, 402, 403, 404 generated by the template. The template used to render this scene renders each frame from a first shot of the first chain into animating regions 410, 411, 412. Note that the regions vary in size and location to give the effect of animation. The last frame 413 of the first chain is rendered on left side of the image 404 as a still frame, while the frames 414 are rendered into the region on the right side of the following output images. In addition to varying the size and location of the regions, the templates can distort, rotate, and reflect the boundary of the regions.

Figure 5:
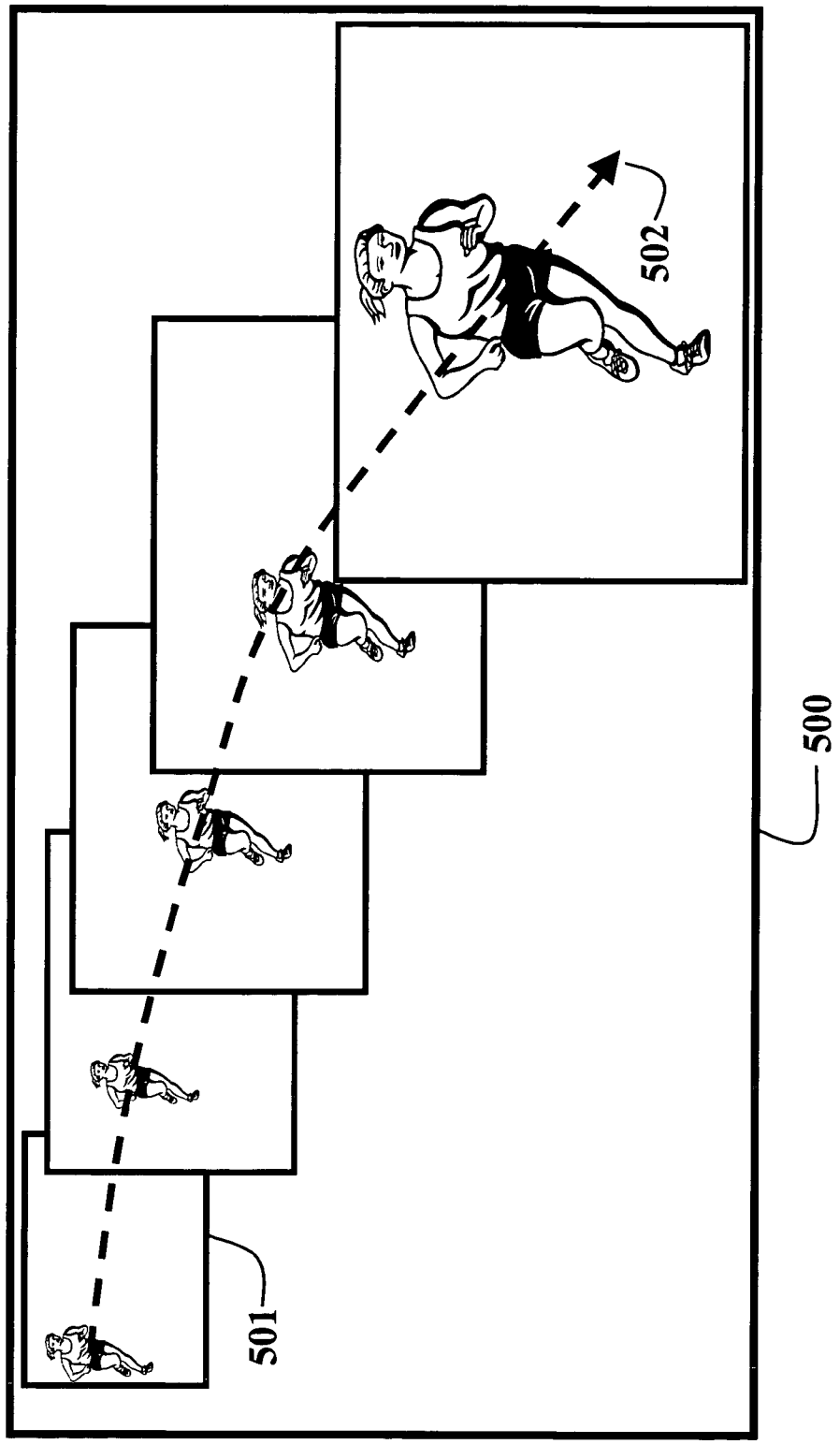
FIG. 5 is a block diagram of animated frames using a camera path as a context according to the invention.

As shown in FIG. 5, a template can animate the region 501 of the output images 500 according to a camera path 502. In this example, a runner first appears in the upper left of the fits frame of the shot. As the runner approaches, the camera pans and zooms to follow the runner. Therefore, the region of the output images that is used to render the frames from the input video increases in size as it moves from the top left to the bottom right to animate according to the camera path. FIG. 7 shows some example templates.

Combine Rendered Images into Output Video

The rendered images 251 are arranged sequentially 260 to produce an output video 261. As stated above, each image can include one or more frames displayed concurrently, perhaps with animation. The output video is re-encoded according to the MPEG-2 standard. The combining 260 also inserts the audio track 102 from the input video 100. The audio track is synchronized according to the rendering.

The output video 261 can be played back using a conventional video playback device.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A computer implemented method for converting and displaying a video, comprising:

segmenting an input video acquired of a scene into shots;

comparing the shots with each other to determine similar shots;

combining the similar shots into corresponding chains, in which each chain includes the similar shots;

generating, for each frame of the input image, a composite image, in which the composite image includes frames from different chains according to a template;

rendering, for each frame of the input video, the composite image according to the chains and the template, and in which selected images include a plurality of regions, there being one region for each one of a selected chain;

rendering concurrently frames from the selected chains into the corresponding regions of the composite images; and arranging sequentially the composite images in an output video.

2. The method of claim 1, further comprising:

playing back the output video on a display surface as a sequence of the composite images.

3. The method of claim 1, in which the input video is segmented using color histograms for each frame of the input video.

4. The method of claim 1, in which a resolution of composite images in the output video is substantially larger than a resolution of the frames of the input video.

5. The method of claim 1, in which the input video includes first shots of a first character talking, and second shots of a second character talking, and the template is designed to render concurrently frames of the first shots in a first region of the corresponding composite images, and frames of the second shot in a second region of the corresponding composite images.

6. The method of claim 5, in which a still frame of the first shots is rendered in the first region of the corresponding composite images when the second character is talking and the frames of the second talking character are rendered in the second region of the corresponding composite images, and a still frame of the second shots is rendered in the second region when the first character is talking and the frames of the first talking character are rendered in the first region.

7. The method of claim 6, further comprising:

fading the still frames.

8. The method of 6, further comprising:

reducing a color saturation of the still frames over time.

9. The method of 6, further comprising:

blurring the still frames.

10. The method of claim 6, further comprising:

pixelating the still frames.

11. The method of claim 6, further comprising:

converting the still frames to a sepia tone.

12. The method of claim 6, further comprising:

animating the regions.

13. The method of claim 1, further comprising:

detecting shot boundaries to segment the input video.

14. The method of claim 1, further comprising:

constructing a color histogram for each frame of the input video;

comparing the color histogram of adjacent frames to determine similar frames; and combining similar frames into corresponding similar shots.

15. The method of claim 14, further comprising:

combining shots having less than a predetermined number of frames that overlap with an immediately following shot.

16. The method of claim 14, in which the color histograms are used to determine the similar shots.

17. The method of claim 16, further comprising:

comparing the color histogram of a first frame of a current shot with the color histograms of a predetermined number of last frames of a predetermined number of previous shots to determine the similar shots.

18. The method of claim 1, in which the chains of similar shots overlap each other.

19. The method of claim 1, further comprising:

estimating camera motion in the input video; and rendering the frames into the composite images according to the camera motion.

20. The method of claim 19, in which the camera motion is estimated from motion vectors in the input video.

21. The method of claim 1, in which the templates depend on a structure of the video, the structure including number and pattern of the chains, a number of shots in the chains, lengths of the chains, and an amount of overlap of the chains.

* * * * *